United States Patent [19]

Armstrong et al.

[11] Patent Number: 5,013,924
[45] Date of Patent: May 7, 1991

[54] CURING COMPOSITIONS WITH ULTRAVIOLET LIGHT

[75] Inventors: Tom Armstrong, Van Nuys; Alex Bimanand, Burbank; Dennis M. Jacques, Sr., Palmdale; John A. Raffo, Simi Valley, all of Calif.

[73] Assignee: Sierracin Corporation, Sylmar, Calif.

[21] Appl. No.: 163,701

[22] Filed: Mar. 3, 1988

[51] Int. Cl.$^5$ .............................................. H01J 37/20
[52] U.S. Cl. .............................. 250/504 R; 250/492.1; 250/493.1; 250/504 H
[58] Field of Search ............. 250/492.1, 504 R, 493.1, 250/372

[56] References Cited

U.S. PATENT DOCUMENTS

| | | | |
|---|---|---|---|
| 3,970,856 | 7/1976 | Mahaffey et al. | 250/493.1 |
| 4,011,456 | 3/1977 | Bredewater et al. | 250/492.1 |
| 4,198,465 | 4/1980 | Moore et al. | 428/409 |
| 4,229,658 | 10/1980 | Gonser | 250/493.1 |
| 4,263,366 | 3/1981 | Lorenz et al. | 428/332 |
| 4,297,583 | 10/1981 | Nerod | 250/504 R |
| 4,308,120 | 12/1981 | Pennewiss et al. | 204/159.23 |
| 4,319,811 | 3/1982 | Tu et al. | 351/166 |
| 4,544,466 | 10/1985 | Lindstrom | 204/159.11 |
| 4,552,932 | 11/1985 | Schollenberger | 525/440 |
| 4,582,998 | 4/1986 | Gonser et al. | 250/492.1 |
| 4,584,480 | 4/1986 | Silverman et al. | 250/504 R |
| 4,591,724 | 5/1986 | Fuse et al. | 250/504 R |
| 4,705,955 | 11/1987 | Mileikowsky | 250/492.1 |
| 4,707,586 | 11/1987 | Voss et al. | 219/203 |
| 4,707,609 | 11/1987 | Shimamura | 250/442.1 |

OTHER PUBLICATIONS

U.S. Pat. Application, for: Electrically Conductive Window and a Method for its Manufacture, Lyle H. McCarthy, "Portable UV Curing System Speeds Field Repairs," Design News, 102 (Sep. 22, 1986).
E.C. Lupton, Jr., D.F.C. Simmonds, and R. Longo, "UV-cured Coatings Protect Optical-Grade Resins," Plastics Engineering, 59 (Jan., 1985).
C.F. Lewis, "Radiation Cures at the Speed of Light," Materials Engineering, 40 (Nov., 1987).

Primary Examiner—Jack I. Berman
Assistant Examiner—Kiet T. Nguyen
Attorney, Agent, or Firm—Stephen Donovan

[57] ABSTRACT

Ultraviolet light curing of a composition on a unit such as an aircraft canopy includes an ultraviolet light generator mounted for movement in at least three directions of motion relative to the unit. The generator is selectively movable in relation to the unit according to prerequisite procedure. A regulated environment cell is provided for the curing. The ultraviolet generator follows predetermined sequences and can be located partly within the canopy during curing. The canopy, after being mounted on a mobile fixture in the horizontal position is pivotally turned to be vertically located strategically relative to the ultraviolet light source during curing.

15 Claims, 2 Drawing Sheets

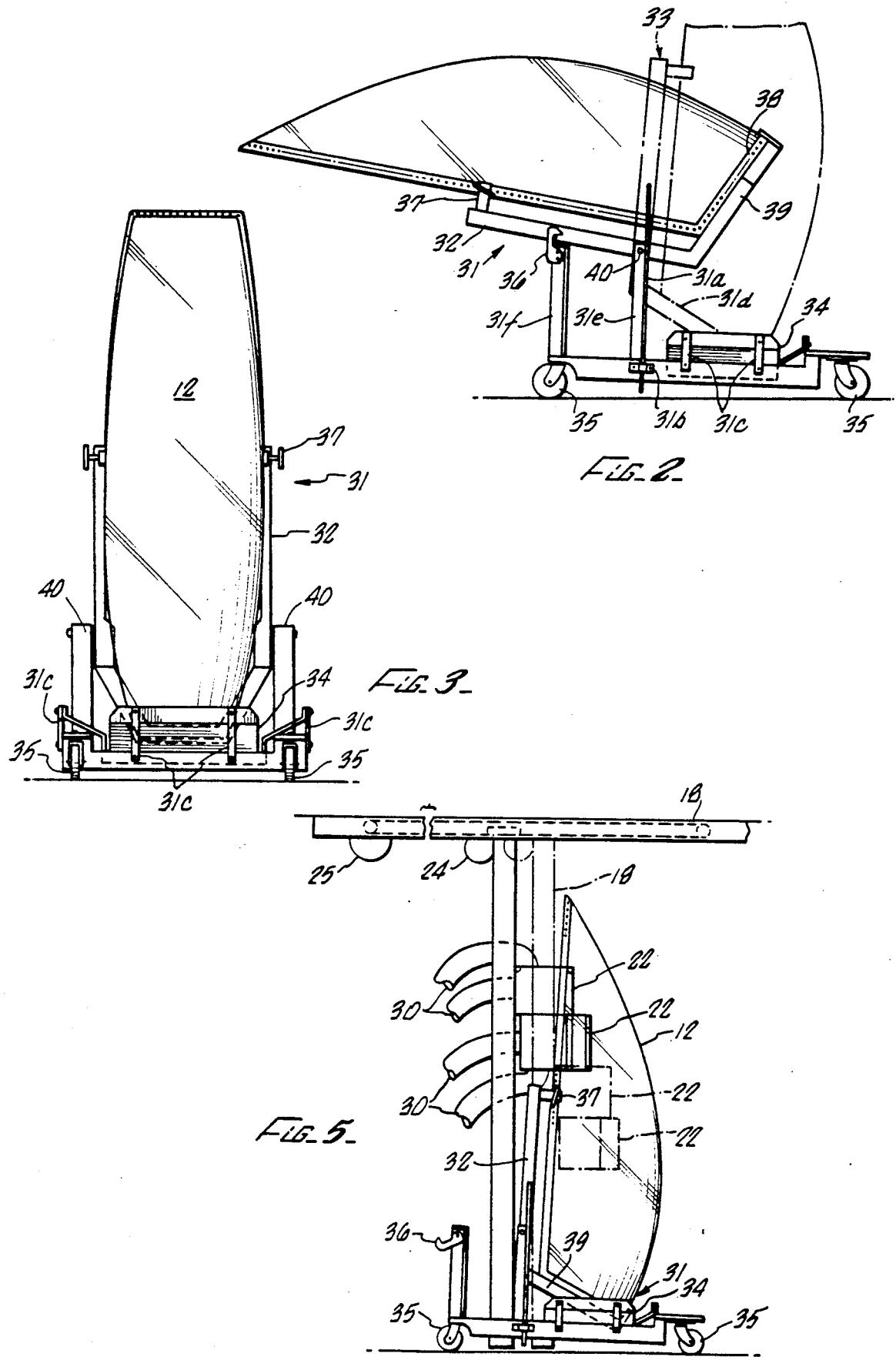

CURING COMPOSITIONS WITH ULTRAVIOLET LIGHT

BACKGROUND

This invention relates to curing compositions under ultraviolet light. In particular, it relates to a device and method for curing compositions placed on aircraft canopies, which are conventionally made of different layers of a polymeric material, typically combinations of acrylic, polyurethane and polycarbonate.

It is essential in the formation of aircraft canopies, particularly for high speed fighter aircraft such as the F-16, that the material forming the canopy be precisely and uniformly cured so as to prevent irregularity and haze. For fighter pilots, any distortion of the canopy could have serious consequences. It is accordingly necessary to provide a system for layering different compositions for hardness on a canopy which are optically precise, while at the same time being resistant to scratches.

Conventionally, arcylic materials are used for this purpose and they can either be heat-cured or cured under ultraviolet light. Difficulty has presented itself in curing the internal surface of the canopy with a regularity sufficient to meet military specifications. This difficulty arises partly from the high degree of curvature of the canopy and the inability to provide an effective suitable ultraviolet curing process and procedure for such units. Other problems arise from the irregularity of the ultraviolet light source and from ambient conditions about and around the curing zone relative to the ultraviolet light source and also the operative requirements of the light source.

Many different compositions can be used on the canopy for providing different properties and these are illustrated, for instance, in the following patents, patent application and publications: U.S. Pat. No. 4,552,932; U.S. Pat. No. 4,544,466; U.S. Pat. No. 4,319,811; U.S. Pat. No. 4,707,586; U.S. Pat. No. 4,198,465; U.S. Pat. No. 4,263,366; and U.S. Pat. No. 4,308,120; U.S. patent application Ser. No. 158,579, filed Feb. 22, 1988 Applicants DeCamp, Raffo, Bimanand, assigned to Sierracin Corporation, entitled "Electrically Conductive Window and a Method for The Manufacture" and for which the declarations and assignments were signed on Feb. 17, 1988); Lyle H. McCarty, *Design News*, 102 (1986, September); E. C. Lupton, *Plastics Engineering*, 59 (1985, January); and C. F. Lewis, *Materials Engineering*, 40 (1987, November). The contents of the above patents, the patent application and publications are incorporated herein by reference.

It is an objective of the present invention to provide a device and method for curing units, particularly laminated polycarbonate aircraft canopies, and especially those which require great optical clarity. The invention seeks to overcome drawbacks with existing heat or ultraviolet light curing systems.

SUMMARY

By this invention, this objective and need are fulfilled. There is provided apparatus for ultraviolet light curing of a composition on a unit. An ultraviolet light generator is mounted for movement in three directions of motion relative to the unit. The mounting means for the generator provides for selectively moving the generator relative to the unit in the three directions according to a prerequisite programmable and repeatable procedure.

The mounting means includes a suspended gantry fixed to a ceiling and walls. The ultraviolet light generator can move vertically, horizontally, and also oscillate in a horizontal plane through a requisite arc.

The unit, which in cases where it is a fighter aircraft canopy, constitutes an envelope of substantial curvature. The curvature of the canopy cross-sectionally covers about a 270 degree arc.

The canopy is located on a mobile fixture which is pivotally structured whereby there can be horizontal location for mounting and removal of the canopy from the fixture. The fixture is also capable of being vertically located so as to support the canopy vertically relative to the ultraviolet light source during curing.

The ultraviolet light generator includes lamps which are horizontally canted relative to each other, thereby to disburse evenly energy horizontally over an arc and thereby avoid hazing of the composition during the curing operation.

The ultraviolet light generator is located in a darkened cell where the environment is regulated with respect to dirt contamination temperature, and humidity. There is a laminar air flow through the cell to minimize the ingress and movement of impurities and particles which could adversely affect the composition during curing operations.

Processing of the canopy is effected by the use of multiple different coatings, different curing sequences for each of the coatings, and with the ultraviolet generator at predetermined different distances from the canopy. The distance and rate of travel of the ultraviolet lamps relative to the coated canopy surface are determined according to the requisite degree of curing effect necessary for the canopy.

The curing sequence is preferably two-stepped. There is a fast flash curing action with the ultraviolet light generator moving in a straight vertical line at a relatively remote distance from the canopy. Secondly, there is a slower, oscillating cure with the ultraviolet light more closely located relative to the canopy. In the slower cure, the ultraviolet light oscillates through a particular horizontal sequence, and is stepwise moved to different vertical levels where the oscillations are repeated.

The unit composition is applied in a liquid formulation to the aircraft canopy and the composition hardens under curing.

The invention is now further described with reference to the accompanying drawings.

BRIEF DESCRIPTION OF THE DRAWINGS

FIG. 2 is a side view of a mobile fixture for a canopy, the canopy being shown in the almost horizontal position.

FIG. 3 is a rear view of the mobile fixture for a canopy, the canopy and fixture being shown in a vertical position.

FIG. 5 is a view of the mobile fixture with the canopy vertically located during cure, and with the curing device in position relative the canopy.

DETAILED DESCRIPTION

Figure 1:
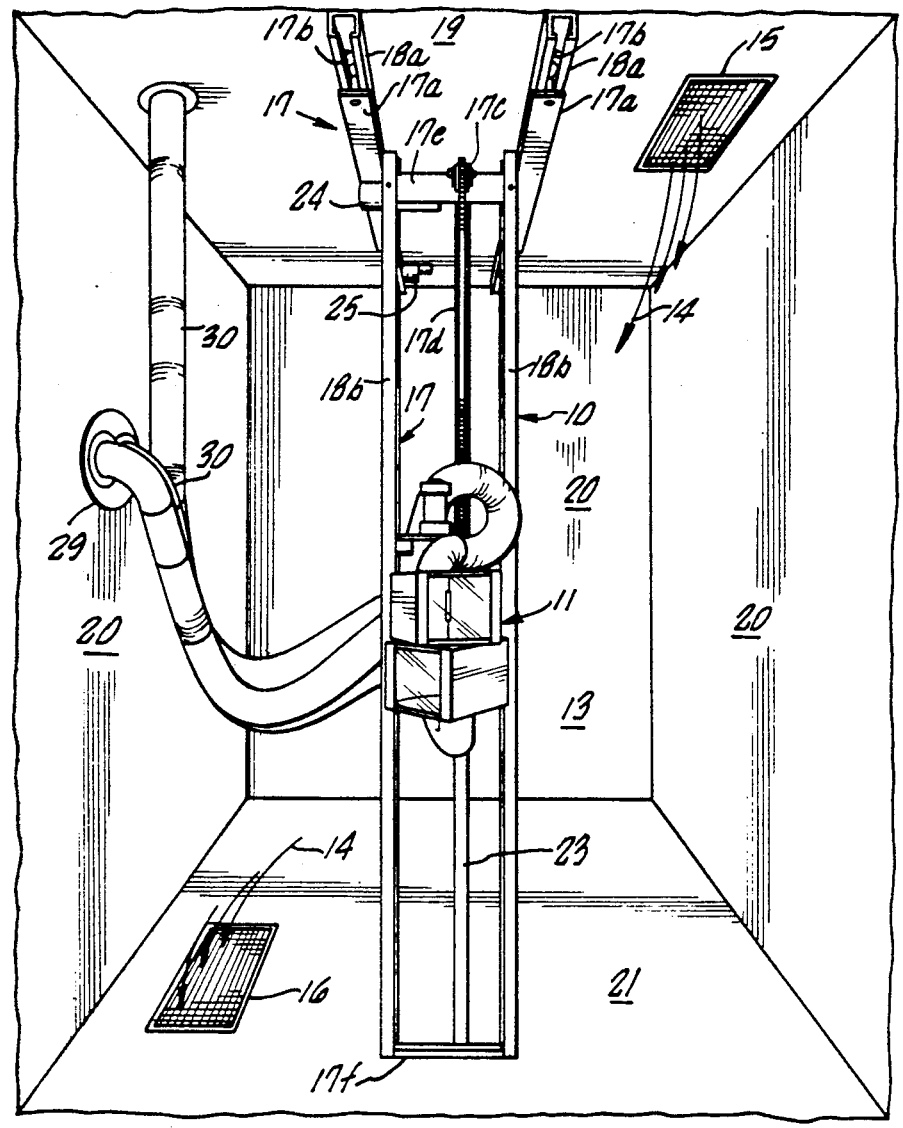
FIG. 1 is a perspective side view of a cell with an ultraviolet curing device located in the cell.

The ultraviolet light curing device includes a preprogrammable, automatic position controlled, gantry-type robot 10 able to move an ultraviolet light generator 11 as required. The gantry-type robot 10 is operable rapidly through programmed repetitive functions singly or simultaneously in three directions of motion to cure coatings inside a vertically standing aircraft canopy 12, which is about ten feet in length.

The ultraviolet light curing device 11 is located in a regulated environment cell 13 of controlled temperature, differential pressure and humidity. The cell 13 for such an environment measures approximately seven feet wide by eleven feet long and eleven feet high. A laminar air flow 14 is effected through the cell 13 to minimize the effect of impurities in the cell 13 during coating and curing, while the unit, substrate or canopy 12 is being cured and avoids impairing the end product. The air inflow is through inlet vent 15 and the outflow is through outlet vent 16.

The cell 13 is a generally darkened construction. The gantry assembly 17, the horizontal tracks and guides or roller guides 18a, and vertical tracks and guides or roller guides 18b, are generally of metal, preferably aluminum, which is chemically blackened by painting. Other metal components are also blackened. The components are free of silicone. The gantry assembly 17 includes means to attach to and suspend the gantry from the cell ceiling 19 and the walls 20 as appropriate and remain removed from the floor 21. Gantry assembly 17 includes horizontal motion support brackets 17a, horizontal roller 17b, vertical drive chain guide or sprocket 17c, vertical drive chain 17d, upper vertical roller guide strut 17e, and lower vertical roller guide strut 17f.

The ultraviolet light generator 11 includes two lamps 22 mounted on the vertical gantry motion drive chain 23 (chain is shown covered) so as to permit horizontal oscillation at a variable speed, with an arc of about 270 degrees. The motor 24 for moving the lamps on the gantry 23 upwards and downwards, and the motor 25 for gantry movement horizontally forwards and backwards, and the motor 26 for side-to-side lamp oscillation are micro-stepping motors having 25K steps per revolution. A holding brake device is included in the motor 24 vertical drive. The energy output of the motors is approximately as follows: the horizontal motor 25 is 260 ounce-inch torque; the vertical motor 24 is 380 ounce-inch torque; and a horizontal sweep motor 26 for the ultraviolet lamp is about 260 ounce-inch torque.

The control system for the curing device includes an indexer, driver power supply and related switches, relays and indicator lamps. The control system is installed on an outside wall of the cell 13. A convenient control includes an indexer of the Parker Compumotor, model 3000-3P, and a Parker compumotor Stepper motor drive, model C-D0. In a modification, a motor can be provided to permit for oscillation in a fourth direction of motion, for instance, a vertical sweep or oscillation of the lamps 22.

The ultraviolet light generator 11 includes at least two lamps 22 as the source of ultraviolet light. These, for example, are model F-200R Super 6 Ultraviolet Generator, 200 watts/inch, with FB9H and R500 dimpled reflectors 28 operating on 200-240 VAC. (Fusion Curing Systems of Rockville, Md. Bulbs 27 of these lamps 22 do not produce any ozone, except for a brief moment at the start, since a quartz envelope of the lamp screens out wavelengths below 200 nanometers after reaching the operating temperature. This effectively filters out ozone-producing wavelengths at 182 nanometers. The advantage of this is that essentially only the desired energy above 200 nanometers is then applied to the flow-coated material on the polycarbonate canopy panel 12. A high intensity energy, between 20 and 1000 millijoules per square centimeter, can be obtained from the lamps 22 at this wavelength to provide an effective cured coating for the canopy 12.

For removal of the necessary and regulated coating environment for the lamps from the cell, an exhaust blower 29 is provided to the housings of lamps 22 whereby heated air from the lamps 22 can be removed from the cell 13 through flexible ducts 30. This system is more effective than blowing cooling air directly into the cell 13 which would have attendant problems associated with impurities and contaminants being introduced into the cell 13 during coating and curing.

The two lamps 22 are canted relative to each other at an appropriate angle about a vertical axis. This effects an even horizontal energy dispersal from the lamps 22 as the lamps 22 oscillate horizontally about their arc within the canopy 12 during curing. The formation of haze lines on the canopy 12 which otherwise would cause unacceptable optical characteristics to the canopy 12 is thereby avoided.

Figure 4:
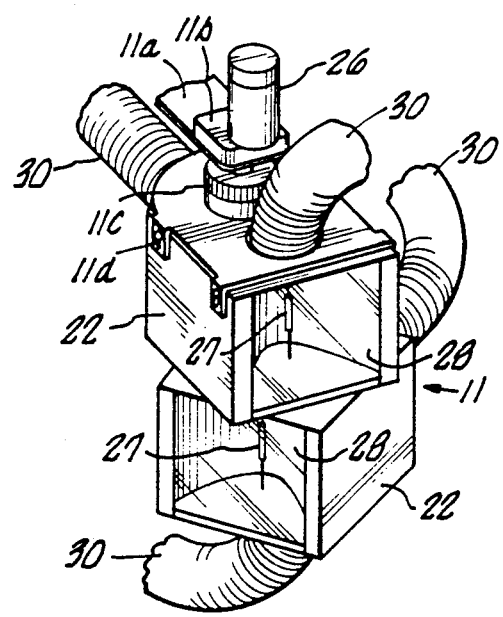
FIG. 4 is a detailed perspective view of the ultraviolet light curing lamps.

Also shown FIG. 4 are sweep motion motor support bracket 11a, sweep motion reduction gear housing 11b, sweep motion proximity switch trigger 11c, and lamp housing support bracket 11d.

An effective coating process for the canopy 12 can be provided by applying multiple different coatings, as much as four coatings, to provide the requisite characteristics to the canopy 12.

Each of the coatings used in practice of this invention comprises a crosslinked acrylate and vinyl composition such as 2-aminoethyl methacrylate, 2-phenoxyethyl acrylate, isobornyl acrylate, 1,6-hexanediol diacrylate, tripropylene glycol diacrylate, trimethylolpropane triacrylate, divinyl benzene, N-N-, methylene bisacrylamide, allyl diglycol carbonate, and the like. A free radical producing photoinitiator or photosensitizer for acrylate resin is also incorporated in the coating. These compounds, after exposure to ultraviolet light, produce reactive species which can initiate the photopolymerization of acrylate composition. Some examples of these compounds include benzophenone, acetophenone, dimethoxyphenyl acetophenone, benzoin alkyl ethers, and the like. The coatings are applied to the substrate in a solvent mixture. The solvents allow uniform application of the composition to the substrate. Solids content preferably is in the range of from 10 to 25 percent of the total weight of the composition. The solution is applied to the substrate and the solvents are allowed to evaporate for about 30 minutes, leaving a layer of deposited solids. The resins in the layer are then exposed to ultraviolet radiation to initiate polymerization. Radiation is preferably in a wavelength range of 200 to 400 nanometers.

Details of the preferred composition constituents with their proportions and curing process and sequence are set out in the U.S. patent application Ser. No. 158,579, the contents of that application being incorporated herein as part of the preferred description.

Different curing sequences can be used for each coating, and as required, a different energy level, measured in millijoules per square centimeter, can be used to effect suitable curing. The distance of the lamps 22 from the canopy 12 is determined according to the requisite coating and the canopy being cured. The rate of travel of the ultraviolet light generator 11 over the three directions is also determined according to the nature of the canopy 12 and the composition being cured.

The energy of the UV radiation at the surface of base and topcoat is preferably in the range of 800 to 1200 millijoules per square centimeter. Insufficient energy may not effect sufficient polymerization which, in turn, does adversely affect adhesion, solvent and abrasion resistance of these coatings. The preferred energy range for the coating sandwiched between the base and topcoats is between 100 to 500 millijoules per square centimeter. Higher or lower energy levels will have an adverse effect on the crosshatch adhesion and humidity resistance of the coating system. In general, the coatings cure rapidly, are free of haze and have excellent abrasion, solvent and humidity resistance.

The substances or compositions to be cured on the canopy are applied in any suitable manner, for instance, a flowcoat application. This is effected when the canopy 12 is in the cell 13. Thereafter the cell 13 is evacuated of personnel so that curing under the ultraviolet light conditions can be effected.

An effective curing procedure is for a fast-flash cure with the ultraviolet light generator 11 relatively further removed from the canopy 12, and moving in a straight vertical line. There is then a second slower, closer horizontally oscillating cure of the canopy 12 at different vertical heights. Such a procedure provides for a durable coating optically acceptable to military specifications for high performance canopies for fighters such as the F-16 aircraft.

By keeping the unit or canopy 12 to be cured stationary and having the ultraviolet light generator 11 movable in at least three directions, there is obtained an effective curing procedure for curing units 12 such as aircraft canopies. The three directions for movement of the generator 11 are vertically, horizontally towards and from the canopy 12, and horizontally in a sweeping arc relative to the canopy 12.

A mobile fixture 31 for supporting a canopy 12 is of such a nature whereby a canopy 12 which is relatively delicate during the formation stage can be mounted, prior to curing, in a horizontal position on a suitable support frame 32. The frame 32 and the canopy 12 are then tilted about a pivotal mounting 40 into a vertical position 33 and located strategically in the cell 13 prior to the curing procedure. Coating compositions are then flowed on to the canopy 12. Any excess composition drains into a tray 34 mounted at the foot of the fixture 31. On removal of the fixture 31 and canopy 12 from the cell 13 on wheels 35, the frame 32 with its canopy 12 is pivoted back to the horizontal. The completed canopy 12 can then be removed easily from the fixture 31. A suitable lock 36 for the fixture 31 is provided to secure the frame 32 in a horizontal position. Additional anchoring means 37 is provided to secure the canopy 12 with the support frame 32. In the vertical position the canopy 12 thus does not separate from the frame. The rear 38 of the canopy 12 rests on the base 39 of the frame 32. The frame shape is an L-type structure with an outline conforming with the perimeter part of the canopy 12.

Mobile fixture 31 also includes locating pin 31a, locating pin support guide 31b, tray support brackets 31c, rear support bracket strut 31d, rear support bracket 31e, and forward support bracket 31f.

The illustration in FIG. 5 shows the canopy 12 and gantry 18 and lamps 11 in a first position in solid lines. The phantom lines 37 show the canopy 12 and gantry 18 in a second position with the lamps 22 in a second illustrative position.

Although the invention has been described with reference to the ultraviolet light curing of aircraft canopy units, it will be readily understood that many modifications and other unit applications are possible. For instance, the curing of planar-like panels, or other curved panels in a regulated environment can be effected in the curing cell with the curing device and method. Suitable adaption to the prerequisite program for curing can be effected according to required specifications. Moreover, more than two lamps 22 can be used as the ultraviolet light generator 11, and increased direction of motion can be used with the apparatus.

Many other examples of the invention exist, each differing from others in matters of detail only. The invention is defined solely by the following claims.

What is claimed is:

1. Apparatus for curing a composition on a unit by ultraviolet light comprising an ultraviolet light generator, a mobile mounting for the generator, means for selectively moving the generator on its mounting relative to the unit in at least three directions relative to the unit and according to a prerequisite procedure, wherein the mounting is a gantry, the generator being movable backwards and forwards in a first direction in relation to the unit, upwardly and downwardly in a second direction in relation to the unit, and being oscillatible sideways in a third direction in relation to the unit.

2. Apparatus as claimed in claim 1 wherein the generator oscillates through at least a 270 degree arc.

3. Apparatus as claimed in claim 1 including means for suspending the gantry from a ceiling and a wall of a cell, the suspending means retaining the gantry removed from the floor.

4. Apparatus as claimed in claim 3 wherein the gantry includes components of substantially blackened metal free of silicone.

5. Apparatus as claimed in claim 5 further comprising a mobile fixture upon which the unit is mounted, the mobile fixture being strategically located in the cell.

6. Apparatus as claimed in claim 5 wherein the unit includes an aircraft canopy adapted for vertical location on the fixture during curing.

7. Apparatus as claimed in claim 6 wherein the fixture includes a tray for receiving excess of the composition to be cured which drains from the unit during curing.

8. Apparatus as claimed in claim 7 wherein the fixture includes a pivot mounting permitting the canopy to be placed and removed on the fixture in a horizontal position, the mounting and canopy being adapted to be pivotally turned into a vertical position during curing.

9. Apparatus as claimed in claim 5 includes means for laminar airflow through the cell during curing.

10. Apparatus as claimed in claim 6 wherein the generator is adapted for different relative locations in relation to the canopy for more than one curing sequence, the curing sequences being different, and comprising a first flash curing of a coating, and thereafter an additional slower curing.

11. Apparatus as claimed in claim 1 wherein the generator includes at least two ultraviolet light lamps, the lamps being canted relative to each other whereby light from the lamps is broadly disbursed thereby to minimize irregular curing.

12. Apparatus as claimed in claim 12 wherein the lamps are canted thereby to avoid hazing of the curing composition on the canopy.

13. Apparatus for curing a composition on a unit by ultraviolet light comprising an ultraviolet light generator mounted for movement in at least three directions relative to the unit, a mounting for the generator, means for selectively moving the generator relative to the unit in at least three directions according to a prerequisite procedure wherein the ultraviolet ight generator is movable backwards and forwards in a first direction, upwardly and downwardly in a second direction, and oscillatable sideways in the third direction, the generator being adapted for different stationary horizontal locations in relation to the unit for different sequences.

14. Apparatus as claimed in claim 13 wherein the generator includes multiple lamps, the lamps being canted relative to each other whereby light from the lamps is broadly disbursed thereby to minimize irregular curing.

15. Apparatus for curing a composition on an aircraft canopy by ultraviolet light comprising ultraviolet light lamps canted relative to each other thereby to provide a broad spread of light and to prevent hazing during curing, the lamps being mounted for movement in at least three directions relative to the canopy, a mounting for the lamps, means for selectively moving the lamps relative to the canopy in at least three directions according to a prerequisite procedure, the lamps being movable backwards and forwards in a first direction, and being oscillatable sideways in a third direction, the aircraft canopy being in vertical location on a mobile fixture during curing, and the lamps being in a first horizontal position during a flash curing sequence, and the lamps being relatively closer to the canopy and partially embraced by the canopy during a second, slower curing sequence.

* * * * *